March 4, 1969  D. L. PELLETT  3,430,917
INSTRUMENT ADAPTER
Filed Oct. 18, 1965  Sheet 1 of 2

INVENTOR.
DAVID L. PELLETT
BY
Lane, Aitken, Dunner & Ziems
ATTORNEYS

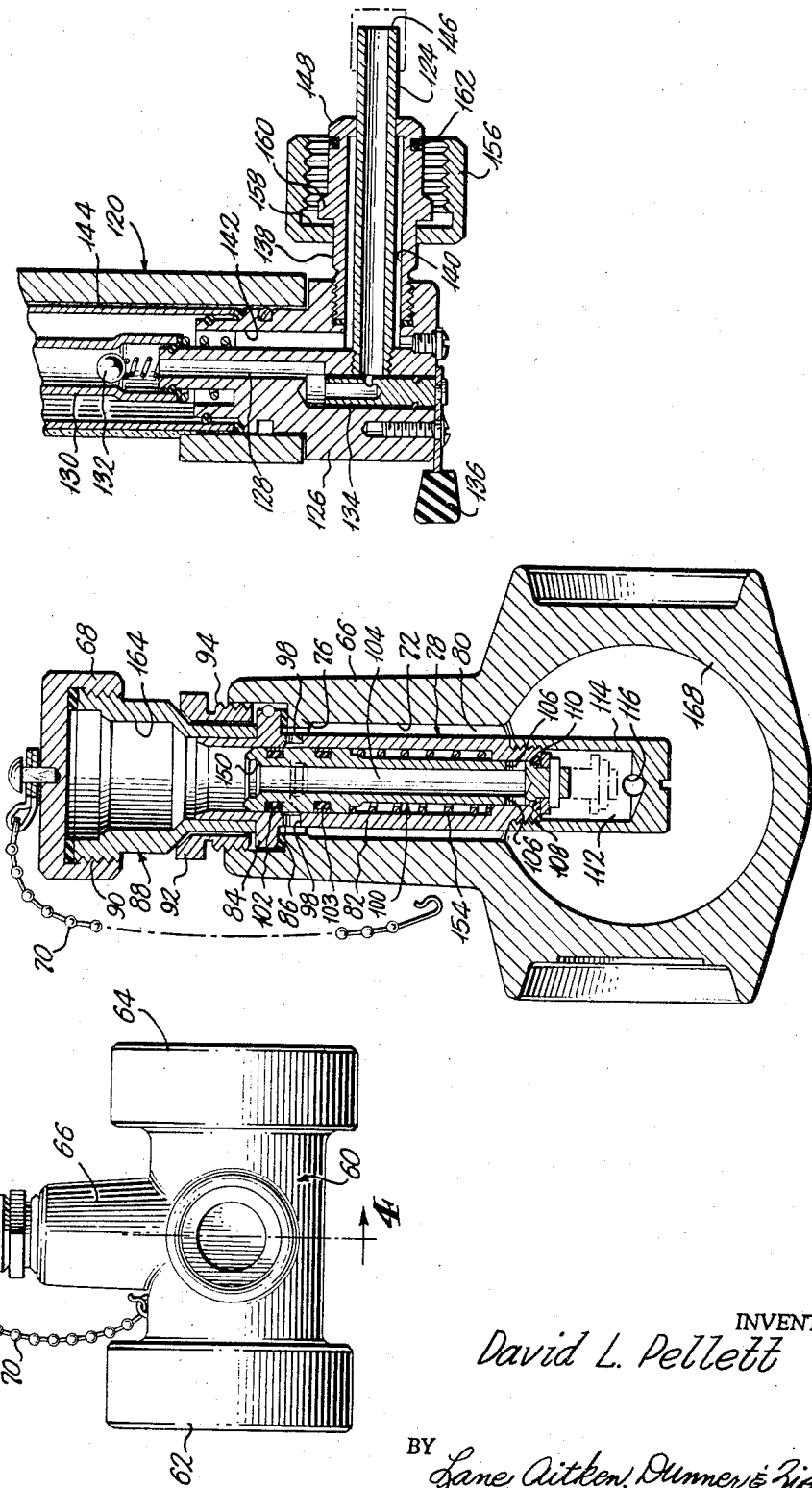

United States Patent Office 3,430,917
Patented Mar. 4, 1969

3,430,917
INSTRUMENT ADAPTER
David L. Pellett, East Greenwich, R.I., assignor to Taco, Inc., Cranston, R.I., a corporation of New York
Continuation-in-part of application Ser. No. 367,357, May 14, 1964. This application Oct. 18, 1965, Ser. No. 497,422
U.S. Cl. 251—149.6    11 Claims
Int. Cl. F16l 37/28, 29/00

ABSTRACT OF THE DISCLOSURE

An instrument adapter for a fluid conduit comprising a valved connector fitting to which an instrument can be removably connected when a reading is to be taken. The fitting has a pair of normally closed passageways therethrough allowing readings to be taken at two points within the conduit and alternatively, allowing flow to proceed from the conduit through an instrument and be returned to the conduit.

---

The present invention relates to instrument adapters, and more particularly to a valved connector fitting for a fluid conduit to which an instrument can be removably connected when a reading is to be taken of the fluid in the conduit. This application is a continuation-in-part of my copending application Ser. No. 367,357, now abandoned, filed on May 14, 1964 and entitled Valve.

In many installations wherein engineering processes are being carried out, it is desirable to obtain measurements at a number of predetermined locations from time to time. When such engineering processes or systems involve fluid flowing under pressure in conduits, a plurality of instruments have been installed in the conduits at the various locations. The instruments are connected to the conduits at all times to provide either continuous readings, or valves have been incorporated in the instruments which can be opened by an operator when a reading is to be taken and closed after the reading has been taken. The instruments employed are often expensive, such as flow meters, for example, and the cost of installing a number of these instruments throughout a system is even more expensive.

Accordingly, it is one object of the present invention to provide an instrument adapter for a conduit which is capable of having an instrument removably mounted thereon when a reading is to be taken and which automatically closes to prevent fluid escaping through the adapter when the instrument is removed after the reading has been taken.

It is another object of the present invention to provide an instrument adapter of the type described above which is simple and economical so as to enable a number of the adapters to be installed in the conduits at the various locations where readings are desired, thereby enabling a single instrument to be removably connected to any one of the adapters when a reading is to be taken at any of the predetermined locations.

It is a further object of the invention to provide an instrument adapter of the type described above which bypasses a portion of the fluid in the conduit therethrough under control of a valve therein, the valve in its closed position preventing fluid escaping through the adapter and in its open position with an instrument mounted thereon communicating the bypassed fluid with the instrument to enable the instrument to take a reading of the portion of the fluid being bypassed.

It is a still further object of the present invention to provide an instrument adapter for a conduit which is capable of accepting an instrument which utilizes pressure indications and which will automatically close when the instrument is removed.

In accordance with one embodiment of the invention, an instrument adapter is provided for an opening in a conduit in which there is an outer tubular element extending outwardly from the conduit opening. An inner tubular element is held within the outer element to provide an annular passageway therebetween for one pressure to be measured. Within the inner element, there is a means communicating with another source of pressure in the conduit. A hollow piston slide valve means is slidingly mounted in the inner tubular element. A port means in the wall of the inner tubular element communicates with the pressure of the annulus and there is a second port means in the wall of the hollow piston means. The port means and the slide valve are arranged relative to each other so that the slide valve covers the port means when it is in one position and uncovers the port means when in a second position.

The invention also provides a biasing means to bias the slide valve towards the first limit of travel to close the ports, and thus prevent the transmission of pressures to the instrument.

Additionally, the invention provides a means for attaching the indicator to the adapter which is so arranged to cause a mating portion of the indicator to actuate the slide valve toward the second position and thus open the port means to transmit the two pressures to the instrument.

Further objects and advantages of the present invention will become readily apparent as the following detailed description of the invention unfolds and when taken in conjunction with the drawings, wherein:

FIG. 3 is a side view of an instrument adapter illustrating another embodiment of the invention;

FIG. 4 is an enlarged sectional view taken along the line 4—4 of FIG. 3; and

FIG. 5 is a sectional view of an instrument to be mounted on the adapter illustrated in FIGS. 3 and 4.

Figure 2:
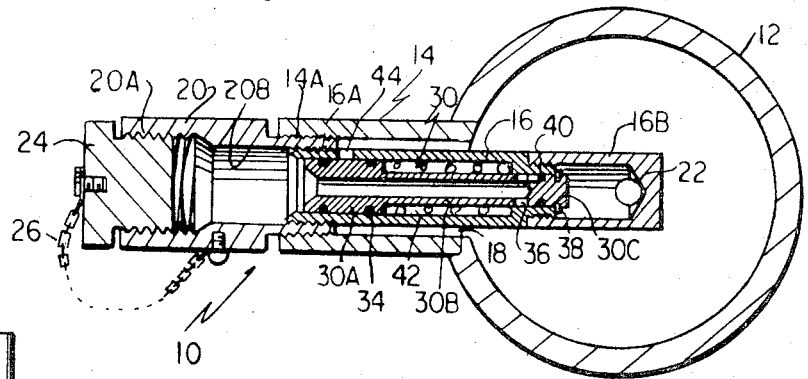
FIG. 2 is a sectional view similar to FIG. 1 with the instrument removed.

A valved connector adapter or fitting 10 is fastened to an opening in a conduit 12. The adapter has an outer tubular element 14 which may be welded or screw threaded in the conduit 12 or be an integral part thereof. A concentric inner tubular element 16 forms an annular passage 18 between the elements 14 and 16. The inner tube 16 has its outer end threadedly connected at 16A with the end of a connector piece 20 while the outer tube 14 is threadedly fastened at 14A to the piece 20. As the outer tube is fixed in an opening of the conduit 12, the annulus 18 is in direct communication with the conduit fluid pressure adjacent the wall.

The inner tube 16 has an extension cap 16B at its inner end that is threadedly engaged to the tube 16, and the extension has a closed end portion with an opening means 22 in one side thereof pointed in an upstream direction. Accordingly, when a fluid flows in the conduit 12, the interior of the inner tube 16 and its extension 16B will be in direct communication with the higher pressure that exists in the center of the conduit due to the velocity head effects.

The connector 20 on the outer end of the fitting 10 has a threaded portion 20A with an internal bore 20B (FIG. 2) which can have a closure 24 placed therein when the instrument is removed; the cap being retained by a chain 26 when not in use, as shown in FIG. 2. The threaded portion 20A and the bore 20B are arranged to accept a threaded projecting portion of an instrument such as a differential pressure indicator 28.

A hollow piston type slide valve 30 is slidably positioned within the inner tubular element 16. The piston slide valve has a heavy wall portion 30A on its outer end in which there are disposed a pair of spaced O-rings 34. These rings provide a fluid-tight sliding seal between the piston 30 and the inner wall of the tube 16. A projecting portion 30B of a reduced diameter is closed on its inner end 30C and has a pair of opposed ports 36 adjacent to the closed end 30C. Within a recess in the end 30C, there is a retainer ring 38. Inwardly and adjacent to the ring is an O-ring 40 that maintains a sliding seal with the inner portion of the end 16B so that when the piston is at one position or limit of travel as in FIG. 2, the pressure entering means 22 cannot be transmitted.

A biasing means shown here as a spring 42 is disposed about the piston extension 30B so as to exert a force urging the piston 30 towards its second position or outer limit. At the outer end of the annulus 18, there is disposed a second port means 44 through the wall of the inner tube 16 which port is covered by the piston 30 when it is in the position shown in FIG. 2.

Thus, the piston 30 is slidably and sealably mounted within limits in the inner tubular element 16. The spring or biasing means 42 upon urging the piston outwardly will cause the retainer ring 38 to seat on the end of the tube 16 as shown in FIG. 2 and in such position is at one limit of its travel. If the tubular slide valve 30 is translated inwardly, due to pressure on its outer end, it can move against the biasing pressure of the spring 42 until the end of the spring 42 is fully compressed, at which point the piston 30 will be at the second end of its limit of travel. It can be seen that by the relative dimension and location of the slide valve 30 and the location of the ports 44 and 36 that the ports are closed when the valve 30 is at one limit of its travel, as shown in FIG. 2, and open when at its second position or limit of travel.

Figure 1:
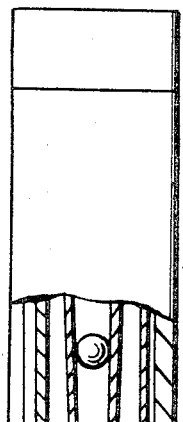
FIG. 1 is a view, partly in section, showing a differential pressure indicator instrument attached to the invention in operable position.
Figure 1:
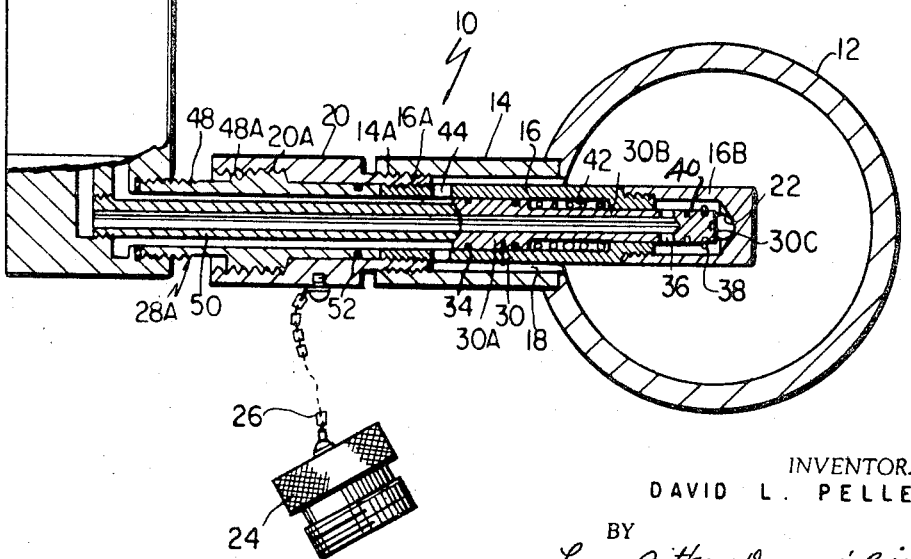

A differential pressure indicator instrument 28 is shown in FIG. 1, operably connected to the adapter 10. As the instrument forms no part of this invention, it will not be described here in detail but it has projecting ends 28A in which there is a pair of concentric tubes with an outer tube 48 and an inner tube 50 wherein the inner tube 50 extends a substantial distance beyond the outer end of the tube 48. A threaded portion 48A is provided along with an O-ring seal 52 on the exterior of the outer tube 48 so as to engage the threaded portion 20A of the extension portion 20.

FIG. 1 shows an instrument 28 in place in the adapter of the present invention wherein the threaded portion 48A is retained in the threaded portions 20A and the projecting end of the inner tube 50 is matingly engaged with the end of the piston 30. As the projecting portions of the instrument 28 are forced inwardly due to the threaded connection, the inner tube 50 pushes the piston 30 inwardly towards its other limit of movement and results in the uncovering of the ports 36 and 44. Thus, the pressure at the center of the conduit 12 is transmitted through the hole 22, the port 36 and into the center of the piston 30 for direct communication with the interior of the tube 50. The pressure in the annulus 18 is then transmitted simultaneously through the port 44 into the annulus between the inner tube 50 and the outer tube 48 of the instrument 28.

When the instrument 28 is unscrewed from the extension 20, the piston 30 moves outwardly due to the urging of the biasing means 42, the ports 36 and 44 are then covered as seen in FIG. 2. The sealed relationship of the ports will prevent leakage of the fluid of the conduit to the outside, and the instrument 28 may be removed from the fitting and the cap 24 replaced for a permanent and positive seal.

The threaded portion 28 in the extension 20 is arranged to receive the projecting portion of the instrument to provide a means for attaching the instrument to the fitting. Such will cause the mating portions of the instrument to actuate the piston 30 towards one end of its limit of travel so as to open the ports and allow the transmission of the two separate pressures to the instrument.

The cover 24 for the fitting as illustrated here is arranged such that when in operable position it sealingly engages the means for attaching the indicator but it is constructed so as not to cause the piston to be actuated.

Referring to FIGS. 3–5, another embodiment of the invention is shown which comprises a T-shaped adapter 60 having coaxially aligned inlet and outlet ports 62 and 64 to enable the adapter to be connected directly to the ends of conduit sections in the path of the fluid flowing through the conduit system. The adapter 60 has a tubular end portion 66 projecting therefrom which is sealed off by a removable cap 68 on the outer end of the end portion. The cap 68 is connected to the adapter by a chain 70 to prevent the cap from being lost or misplaced when it is removed to enable an instrument to be mounted on the end portion 66 as will be described.

Referring specifically to FIG. 4, it will be seen that the tubular end portion 66 has a central bore 72 extending therethrough with an internal flange 76 near the outer end thereof to facilitate mounting a slide valve assembly 78 within the central bore 72 in a manner to define an annular passageway 80. The slide valve assembly 78 comprises a sleeve 82 having a radially projecting flange 84 near the outer end thereof which rests on the outer surface of the flange 76 with a suitable gasket or O-ring 86 positioned between the flanges to prevent fluid escaping therebetween. A fitting 88 having an externally threaded portion 90 on the outer end thereof is secured over the outer end of the sleeve 82 and a bushing 92 having an externally threaded portion 94 on the inner end thereof is secured to the inner end of the fitting 88 in position to threadably engage the outer end of the bore 72 to firmly lock the slide valve assembly in position.

A plurality of ports 98 are provided in the sleeve 82 inwardly of the flange 84 to communicate the annular passageway 80 with the inside of the sleeve 82 when the slide valve assembly 78 is shifted to its open position, as will be described.

A piston 100 is slidably sealed within the sleeve 82 by a pair of axially spaced O-rings 102 and 103 retained in suitable grooves in the enlarged outer end of the piston so as to slidably engage the wall of the sleeve 82. The piston has a central passage 104 which opens on the outer end face of the piston and is closed off at the inner end of the piston. A plurality of ports 106 are formed in the piston near the inner end thereof in position to be sealed within a reduced end portion 108 on the inner end of the sleeve 82 when the piston is in the position illustrated in FIG. 4 which is the closed position. An O-ring 110 is carried on the inner end of the piston in position to engage a tapered seat on the reduced end portion 108 to provide an additional seal for preventing fluid passing into the central passage 104 from a chamber 112 within an end cap 114 secured to the reduced end portion 108. A suitable opening 116 is formed in the side wall of the end cap 114 in position to face in an upstream direction on the center line between the inlet and outlet ports 62 and 64.

Thus when the piston is actuated inwardly (as will be described) to its open position indicated in phantom in FIG. 4, the ports 106 will clear the reduced end portion 108 to enable fluid passing through the chamber 168 between the inlet and outlet ports 62 and 64 to enter the chamber 112 through the opening 116 and pass through the ports 106, through the central passage 104 and into the instrument removably connected to the adapter, as will be described. At the same time, with the piston in its open position, the outer end thereof will be positioned inwardly of the ports 98 as illustrated in phantom to communicate the annular passageway 80 with the inside of the sleeve 82.

Referring specifically to FIG. 5, a flow meter 120 is illustrated which is similar to the flow meter 28 illustrated in FIG. 1. An elongated actuator sleeve 124 (which is the counterpart of the actuator 50 of FIG. 1) is secured to and projects from a ported base 126 on the lower end of the flow meter so as to communicate with an inlet passage 128 which delivers fluid to the inner glass sleeve 130 containing the ball 132. A rotatable valve 134 actuated by a handle 136 is provided between the passage 128 and the actuator 124 to enable the inlet passage to be opened or closed off. A tubular element 138 is fixed to the base 126 and extends over the actuator 124 to define an annular passageway 140 therebetween which communicates with an outlet pasageway 142 in the base 126 which, in turn, communicates with the annular space between the outer glass sleeve 144 and inner glass sleeve 130. The actuator 124 and tubular element 138 have tapered end faces 146 and 148, respectively, designed to seat against a tapered seat 150 on the end of the piston 100 and an internal tapered seat within the fitting 88, respectively, when the instrument 120 is mounted on the adapter. In this position, of course, the actuator 124 will have shifted the piston 100 to its open position against the spring biasing force of a coil spring 154 interposed between the enlarged outer end of the piston and the reduced end portion 108. Conversely, when the instrument is removed, the spring 154 will automatically return the piston to the position illustrated in FIG. 4 to close the ports 98 and 106 to seal off the adapter.

When the instrument is mounted in position as just described with the tapered end faces 146 and 148 engaging the tapered seats 150 and 152, a threaded connector 156 slidably retained on the tubular element 138 can be threadably engaged with the externally threaded portion 90 on the outer end of the fitting 88 so that the end wall 158 of the connector engages a flange 160 projecting from the tubular element to lock the instrument 120 firmly in place. O-ring 162 is mounted on the tubular element 138 in a groove just behind the tapered end face 148 to slidably seal against a cylindrical wall 164 of the fitting 88 as the instrument is being advanced to its seated position. The distance between the O-ring 162 and the end of the actuator 124 is such that the sliding seal provided by the O-ring 162 prevents the escape of fluid outside of the instrument or adapter as the actuator advances the piston to its open position.

When the instrument is firmly connected to the adapter as described, a portion of the fluid passing through the chamber 168 will be bypassed outwardly through the central passage 104 of the piston, through the actuator sleeve 124 and into the inner glass sleeve 130 (assuming the rotary valve 134 has been opened) and then back through the annular passageway between the inner and outer glass sleeves, the outlet passage 142, the annular passageway 140 surrounding the actuator 124, through the ports 98 and through the annular passageway 80 of the adapter back to the fluid passing through the adapter chamber 168.

After the desired reading has been taken, the connector 156 can be disconnected and the instrument simply pulled out of the adapter. The piston 100 will automatically be returned to its closed position by the spring 154 to prevent the escape of fluid and the cap 68 can be threadably connected to the outer end of the fitting 88 to provide a second back-up seal against the escape of fluid from the adapter.

In view of the foregoing, it will be apparent that the embodiments of the invention herein disclosed are well calculated to fulfill the objects of the invention, and it will be appreciated that the invention is susceptible to modification, variation and change without departing from the proper scope or fair meaning of the subjoined claims. For example, although a flow meter has been described as the instrument to be connected to the adapter, it is apparent that other types of instruments, such as thermometers and pressure gauges, for example, could be removably mounted on the adapter for taking temperature and pressure readings. Such other instruments could, by employing the actuator 124 and tubular element 138, withdraw and return a portion of the fluid from the conduit to take its reading on this portion of the fluid as it is being bypassed, or a modified arrangement could be employed wherein the annular passageway 140 between the tubular element 138 and actuator sleeve 124 is eliminated or closed off so that when the instrument is mounted in position it will communicate with the fluid in the conduit only through the central passage 104 of the piston 100. With such a modified arrangement, the outer end of the piston 100 would be positioned below the ports 98 when the instrument is mounted in position, but the ports will be in effect sealed off by the tapered end faces 146 and 148 seated against the tapered seats 150 and 152 because of the fact that the annular passageway 140 is eliminated or closed off.

What is claimed is:

1. In an instrument adapter for connecting such instrument to an opening in a conduit, the combination including an outer tubular element extending outwardly from said opening, an inner tubular element held in said outer tubular element and providing an annular passageway therebetween closed at the outer end thereof for one pressure to be measured, means communicating said inner tubular element with another source of pressure in said conduit, hollow piston slide valve means slidably mounted in said inner tubular element, the interior of said slide valve means communicating with the outer end thereof, port means in the wall of said inner tubular element communicating with said annular passageway, second port means in the wall of said slide valve means communicating with the hollow interior thereof, said slide valve means and both port means being arranged relative to each other so that said slide valve closes both of said port means when said slide valve is in one position and opens both of said port means when in a second position caused by an instrument being attached to said adapter.

2. In an instrument adapter for connecting such instrument to an opening in a conduit, the combination including an outer tubular element extending outwardly from said opening, an inner tubular element held in said outer tubular element and providing an annular passageway therebetween closed at the outer end thereof for one pressure to be measured, means communicating said inner tubular element with another source of pressure in said conduit, hollow piston slide valve means slidably mounted in said inner tubular element, the interior of said slide valve means communicating with the outer end thereof, port means in the wall of said inner tubular element communicating with said annular passageway, second port means in the wall of said slide valve means communicating with the hollow interior thereof, said slide valve means and both port means being arranged relative to each other so that said slide valve closes both of said port means when said slide valve is in one position and opens both of said port means when in a second position caused by an instrument being attached to said adapter, and biasing means biasing said slide valve toward said one position to close said port means.

3. In an instrument adapter for connecting such instrument to an opening in a conduit, the combination including an outer tubular element extending outwardly from said opening, an inner tubular element held in said outer tubular element and providing an annular passageway therebetween closed at the outer end thereof for one pressure to be measured, means communicating said inner tubular element with another source of pressure in said conduit, hollow piston slide valve means slidably mounted in said inner tubular element, the interior of said slide valve means communicating with the outer end thereof, port means in the wall of said inner tubular element communicating with said annular passageway, second port means in the wall of said slide valve means communicating with the hollow interior thereof, said slide valve means and both port means being arranged relative to each other so that said slide valve closes both of said port means when said slide valve is in one position and opens both of said port means when in a second position caused by an instrument being attached to said adapter, biasing means biasing said slide valve toward said one position to close both of said port means, and attaching means for securing said instrument to said adapter and arranged to cause a mating position of said instrument to actuate said piston toward said second position to open both of said port means.

4. In an instrument adapter for connecting such instrument to an opening in a conduit, the combination including an outer tubular element extending outwardly from said opening, an inner tubular element held in said outer tubular element and providing an annular passageway therebetween closed at the outer end thereof for one pressure to be measured, means communicating said inner tubular element with another source of pressure in said conduit, hollow piston slide valve means slidably mounted in said inner tubular element, the interior of said slide valve means communicating with the outer end thereof, port means in the wall of said inner tubular element communicating with said annular passageway, second port means in the wall of said slide valve means communicating with the hollow interior thereof, said slide valve means and both port means being arranged relative to each other so that said slide valve closes both of said port means when said slide valve is in one position and opens both of said port means when in a second position caused by an instrument being attached to said adapter, biasing means biasing said slide valve toward said one position to close both of said port means, attaching means for securing said instrument to said adapter and arranged to cause a mating position of said instrument to actuate said piston toward said second position to open both of said port means, and a cover for said adapter arranged to sealingly engage said attaching means when said instrument is removed without actuating said piston.

5. An instrument adapter installable on a conduit to enable an instrument to be removably connected thereto when a reading is to be taken of fluid passing through the conduit, said adapter having first passageway means therein for communicating with a first source of pressure within said conduit and second passageway means for communicating with a second source of pressure within said conduit lower than said first source of pressure, means on said adapter for removably and sealingly mounting an instrument on the adapter in position to communicate with both of said passageway means, and normally closed single valve means in said adapter actuatable to an open position when the instrument is mounted on the adapter, said valve means sealing off both of said passageway means in said closed position to prevent fluid escaping from said conduit when the instrument is removed from the adapter and when in said open position said valve means opening both of said passageway means for communication with the instrument.

6. The adapter as dfiened in claim 5 wherein said adapter comprises a T-shaped fitting having coaxially aligned inlet and outlet ports to enable fluid to pass therethrough with said projecting end portion being disposed between said inlet and outlet ports.

7. An instrument adapter installable on a conduit to enable an instrument to be removably connected thereto when a reading is to be taken of fluid passing through the conduit, said adapter having an end portion projecting from the path of fluid passing through the conduit, means on said adapter for removably and sealingly mounting an instrument on the outer end of said end portion, first passageway means in said end portion for communicating fluid within the conduit at one source of pressure with said outer end and the instrument when it is mounted on said outer end, second passageway means communicating a second source of pressure within said conduit different than said one source with said first passageway means intermediate the ends thereof, single valve means in said end portion movable between open and closed positions, said valve means closing off said second passageway means and first passageway means when in said closed position and communicating said second passageway means and first passageway means with said outer end when in said open position, and means normally biasing said valve means to said closed position.

8. An instrument adapter comprising a T-shaped fitting having coaxially aligned inlet and outlet ports with a projecting end portion therebetween having a central bore extending therethrough communicating with a main chamber in the adapter between said inlet and outlet ports, slide valve means mounted within said central bore to define an annular passageway therebetween, the outer end of said annular passageway being closed off and the inner end thereof communicating with said main chamber, said slide valve means having a central passageway therein communicating with the outer end of said projecting end portion, means communicating said central passageway with said main chamber near the center thereof, port means communicating said annular passageway with said central passageway, valve means in said central passageway movable between open and closed positions, said valve means closing off said central passageway and annular passageway in a manner to prevent fluid escaping out said outer end when in said closed position and communicating said annular passageway and central passageway with the outer end of said projecting end portion when in said open position, and means normally biasing said valve means to said closed position, said valve means being movable to said open position when an instrument is mounted on the outer end of said projecting end portion of the adapter.

9. The invention as defined in claim 8 wherein said valve means comprises a piston slidably mounted in said central passageway having an enlarged outer end slidably and sealingly engaging the wall of said central passageway, said piston having a central passage therein communicating with the outer end thereof and extending inwardly therefrom, and means for closing off said central passage when said piston is in said closed position and opening said central passage when said piston is in said open position, said piston closing off said port means when in said closed position to prevent fluid escaping out of said annular passageway.

10. An instrument adapter installable on a conduit with an end portion thereof projecting from the path of fluid flowing through the conduit, said adapter having passageway means therein communicating the outer end of said end portion with the fluid passing through said conduit at one source of pressure, means on said end portion for removably and sealingly mounting an instrument on the outer end of said end portion in communication with said passageway means, and a piston mounted in said passageway means for sliding movement between first and second positions, the outer end face of said piston confronting the instrument when it is mounted on said end portion, said piston having a central passage therethrough having one end thereof communicating with said outer end face of the piston, the other end of said central passage communicating with the fluid passing through said conduit at a second source of pressure in said first position of the piston and being sealed off against communication with said fluid in said second position of the piston, said piston when in said second position sealing off said passageway, means to interrupt communication between the outer end of said end portion and the fluid passing through said conduit whereby when an instrument is mounted on the outer end of said projecting end portion and said piston is actuated to said first position, fluid in the conduit can flow through said central passage in the piston into the instrument and out of the instrument through said passageway means back to said conduit and when said instrument is removed and said piston is actuated to said second position, said central passage and passageway means will be closed off to prevent fluid escaping therethrough.

11. In combination, an adapter installable in a fluid system, an instrument for taking a reading of the fluid in said system means for removably and sealingly mounting said instrument on said adapter, first passageway means in said adapter for communicating said instrument with the fluid in said system at one source of fluid pressure, second passageway means in said adapter for communicating said instrument with the fluid in said system at a second source of fluid pressure, said instrument having passageway means therein for communicating with said first and second passageway means to enable a portion of the fluid in the system to be bypassed through said first passageway means and instrument passageway means and back to the system through said second passageway means valve means in said adapter movable between open and closed positions, and means for normally resiliently biasing said valve means to said closed position, said instrument including actuator means engaging and retaining said valve means in said open position, said valve means closing off said first and second passageway means when in said closed position and opening said first and second passageway means to communicate the instrument passageway means with the fluid in said system when in said open position, said valve means automatically returning to said closed position when the instrument is removed from said adapter to prevent fluid escaping from the adapter.

References Cited
UNITED STATES PATENTS

| | | | |
|---|---|---|---|
| 811,763 | 2/1906 | Cole | 73—201 |
| 2,320,456 | 6/1943 | Frazer-Nash | 251—149.6 |
| 2,579,656 | 12/1951 | Douglas et al. | 73—201 |
| 2,628,850 | 2/1953 | Summerville | 137—595 |
| 3,074,430 | 1/1963 | La Belle | 137—595 |
| 3,102,427 | 9/1963 | Trostel | 73—420 |
| 3,152,452 | 10/1964 | Bond et al. | 251—149.6 |
| 3,228,413 | 1/1966 | Stevens | 137—322 |
| 3,280,834 | 10/1966 | Zahuranec | 251—149.6 |

M. CARY NELSON, *Primary Examiner.*

W. R. CLINE, *Assistant Examiner.*